US010723932B2

(12) United States Patent
Contreras

(10) Patent No.: US 10,723,932 B2
(45) Date of Patent: Jul. 28, 2020

(54) CAPSULE DESIGN FOR THE CAPTURE OF REAGENTS

(71) Applicant: SAUDI ARABIAN OIL COMPANY, Dhahran (SA)

(72) Inventor: Elizabeth Q. Contreras, Houston, TX (US)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 16/690,990

(22) Filed: Nov. 21, 2019

(65) Prior Publication Data
US 2020/0087564 A1 Mar. 19, 2020

Related U.S. Application Data

(63) Continuation of application No. 16/230,246, filed on Dec. 21, 2018, now Pat. No. 10,519,359.
(Continued)

(51) Int. Cl.
C09K 8/467 (2006.01)
C04B 28/04 (2006.01)
(Continued)

(52) U.S. Cl.
CPC ............ C09K 8/467 (2013.01); C04B 20/023 (2013.01); C04B 20/1037 (2013.01);
(Continued)

(58) Field of Classification Search
CPC ......... C04B 20/023; C04B 2111/00034; C04B 28/04; C04B 40/0046; C09K 8/467;
(Continued)

(56) References Cited

U.S. PATENT DOCUMENTS 3,429,827 A 2/1969 Ruus
3,511,314 A 5/1970 Scott et al.
(Continued)

FOREIGN PATENT DOCUMENTS

CN 104086089 A 10/2014
GB 1229689 4/1971
(Continued)

OTHER PUBLICATIONS

International Search Report and Written Opinion for related PCT application PCT/US2017/052367 dated Jan. 9, 2018.
(Continued)

Primary Examiner — Zakiya W Bates
(74) Attorney, Agent, or Firm — Bracewell LLP; Constance Gall Rhebergen

(57) ABSTRACT

A method of using a gas control additive to provide gas migration control in a wellbore includes the steps of mixing the gas control additive with a cement to form a cement slurry, where the gas control additive includes a semi-permeable membrane and a scrubbing agent, such that the semi-permeable membrane forms a shell around a core such that the scrubbing agent is in the core, introducing the cement slurry to the wellbore, and reacting the scrubbing agent with an antagonistic gas to produce a helper byproduct, where the antagonistic gas migrates from a hydrocarbon-bearing formation into the wellbore and permeates through the semi-permeable membrane to the core of the gas control additive.

3 Claims, 3 Drawing Sheets

Related U.S. Application Data

(60) Provisional application No. 62/612,751, filed on Jan. 2, 2018.

(51) Int. Cl.

| | | |
|---|---|---|
| *C04B 20/02* | (2006.01) | |
| *E21B 43/22* | (2006.01) | |
| *E21B 33/13* | (2006.01) | |
| *C04B 40/00* | (2006.01) | |
| *C04B 28/02* | (2006.01) | |
| *C04B 20/10* | (2006.01) | |
| *C09K 8/493* | (2006.01) | |
| *C04B 103/00* | (2006.01) | |
| *C04B 14/28* | (2006.01) | |
| *C04B 111/00* | (2006.01) | |
| *C04B 22/00* | (2006.01) | |
| *C04B 16/06* | (2006.01) | |
| *C04B 14/30* | (2006.01) | |

(52) U.S. Cl.
CPC ............. *C04B 28/02* (2013.01); *C04B 28/04* (2013.01); *C04B 40/0046* (2013.01); *C09K 8/493* (2013.01); *C04B 14/28* (2013.01); *C04B 14/308* (2013.01); *C04B 16/0625* (2013.01); *C04B 16/0641* (2013.01); *C04B 16/0666* (2013.01); *C04B 16/0683* (2013.01); *C04B 16/0691* (2013.01); *C04B 22/002* (2013.01); *C04B 2103/0006* (2013.01); *C04B 2103/0014* (2013.01); *C04B 2103/0058* (2013.01); *C04B 2103/0068* (2013.01); *C04B 2103/0086* (2013.01); *C04B 2111/00034* (2013.01); *C09K 2208/20* (2013.01)

(58) Field of Classification Search
CPC .... C09K 2208/20; C09K 8/493; C09K 8/524; E21B 43/0122; E21B 37/06; E21B 49/088
See application file for complete search history.

(56) References Cited

U.S. PATENT DOCUMENTS

| | | | |
|---|---|---|---|
| 3,623,330 | A | 11/1971 | Nakade et al. |
| 4,107,292 | A | 8/1978 | Nemeth |
| 4,324,683 | A | 4/1982 | Lim et al. |
| 4,632,186 | A | 12/1986 | Boncan et al. |
| 5,049,167 | A | 9/1991 | Castro et al. |
| 5,095,987 | A | 3/1992 | Weaver et al. |
| 5,164,099 | A | 11/1992 | Gupta et al. |
| 5,211,234 | A | 5/1993 | Floyd |
| 5,368,102 | A | 11/1994 | Dewprashad et al. |
| 5,437,813 | A | 8/1995 | Akashi et al. |
| 5,631,559 | A | 3/1997 | Dillenbeck, III |
| 5,705,233 | A | 1/1998 | Denes et al. |
| 6,527,051 | B1 | 3/2003 | Reddy et al. |
| 6,554,071 | B1 | 4/2003 | Reddy et al. |
| 6,645,288 | B1 | 11/2003 | Dargaud et al. |
| 6,722,434 | B2 | 4/2004 | Reddy et al. |
| 6,761,220 | B2 | 7/2004 | Blauch et al. |
| 6,786,963 | B2 | 9/2004 | Matherly et al. |
| 7,363,978 | B2 | 4/2008 | Welton et al. |
| 7,476,713 | B2 | 1/2009 | Hild et al. |
| 7,569,630 | B2 | 8/2009 | Ma et al. |
| 7,914,884 | B2 | 3/2011 | Royer et al. |
| 8,029,709 | B2 | 10/2011 | Wu et al. |
| 3,251,143 | A1 | 8/2012 | Drochon et al. |
| 8,383,031 | B2 | 2/2013 | Naji et al. |
| 8,689,873 | B2 | 4/2014 | Abad et al. |
| 8,822,386 | B2 | 9/2014 | Quintero et al. |
| 8,945,279 | B2 | 2/2015 | Aines et al. |
| 10,065,887 | B2 | 9/2018 | Kierat et al. |
| 2004/0171499 | A1 | 9/2004 | Ravi et al. |
| 2005/0203226 | A1 | 9/2005 | Mader et al. |
| 2006/0052251 | A1 | 3/2006 | Anderson et al. |
| 2006/0119926 | A1 | 6/2006 | Liu et al. |
| 2006/0144300 | A1 | 7/2006 | Touzet et al. |
| 2006/0264332 | A1 | 11/2006 | Welton et al. |
| 2007/0209794 | A1 | 9/2007 | Kaufman et al. |
| 2009/0062452 | A1 | 3/2009 | Harder et al. |
| 2010/0025039 | A1 | 2/2010 | Roddy et al. |
| 2011/0086941 | A1 | 4/2011 | Therond et al. |
| 2011/0226690 | A1 | 9/2011 | Kalayci |
| 2012/0165428 | A1 | 6/2012 | Tilara et al. |
| 2013/0295378 | A1 | 11/2013 | Bonin et al. |
| 2014/0262262 | A1 | 9/2014 | Zheng et al. |
| 2015/0099674 | A1 | 4/2015 | Lee et al. |
| 2015/0129207 | A1 | 5/2015 | Bastuba et al. |
| 2015/0159079 | A1 | 6/2015 | Huh et al. |
| 2016/0017688 | A1 | 1/2016 | Chatterji et al. |
| 2016/0068745 | A1 | 3/2016 | Conway |
| 2016/0362594 | A1 | 12/2016 | Rojas et al. |
| 2017/0058191 | A1 | 3/2017 | Mahoney et al. |
| 2017/0073574 | A1 | 3/2017 | McDaniel et al. |
| 2017/0349805 | A1 | 12/2017 | Musso et al. |
| 2018/0258336 | A1 | 9/2018 | Contreras |

FOREIGN PATENT DOCUMENTS

| | | |
|---|---|---|
| JP | 2004131361 A | 11/2005 |
| WO | 2014204677 A1 | 12/2014 |
| WO | 2017137789 A1 | 8/2017 |

OTHER PUBLICATIONS

International Search Report and Written Opinion for related PCT application PCT/US2018/066996 dated Mar. 22, 2019.

E Quevedo, JL Steinbacher, DT McQuade. Interfacial polymerization within a simplified microfluidic device: capturing capsules. Journal of the American Chemical Society, 2005.

JL Steinbacher, DT McQuade. "Polymer chemistry in flow: New polymers, beads, capsules, and fibers." Journal of Polymer Science Part A: Polymer Chemistry, 2006.

N. Abatzoglou & S. Boivin. A review of biogas purification processes. Biofuels, Bioproducts and Biorefining, 3, 42-71, 2009.

Siefers, AM, A novel and cost-effective hydrogen sulfide removal technology using tire derived rubber particles. Graduate Dissertation, 2010.

SJ Broadwater, SL Roth, KE Price, M Kobašlija, DT McQuade. One-pot multi-step synthesis: a challenge spawning innovation. Organic & Biomolecular Chemistry, 2005.

Song et al., "Recent progress in interfacial polymerization", Materials Chemistry Frontiers, 2017, pp. 1028-1040, vol. 1, No. 6, The Royal Society of Chemistry and the Chinese Chemical Society.

T Tadros. Polymeric surfactants in disperse systems. Advances in Colloid and Interface Science, 2009.

X. Wang, X. Ma, X. Xu, L. Sun, & C. Song. Mesoporous-molecular-sieve-supported polymer sorbents for removing H2S from hydrogen gas streams. Topics in Catalysis, 49, 108-117, 2008.

CAPSULE DESIGN FOR THE CAPTURE OF REAGENTS

CROSS REFERENCE TO RELATED APPLICATIONS

This application is a continuation application of U.S. patent application Ser. No. 16/230,246, filed on Dec. 21, 2018, entitled "CAPSULE DESIGN FOR THE CAPTURE OF REAGENTS," which claims the benefit of and priority to U.S. Provisional Patent Application No. 62/612,751, filed on Jan. 2, 2018; the disclosures of which are incorporated by reference in their entireties into this application.

BACKGROUND

1. Technical Field

Disclosed are compositions and methods for use with cement. Specifically, disclosed are compositions and methods for controlling a downhole environment during cement operations.

2. Related Art

In many wellbores, cement can be used to form a layer between a casing and the formation. Gas migration occurs when the hydrostatic pressure of the cement slurry decreases as a result of the cement slurry setting. If the pressure of the gases in the formation is greater than the hydrostatic pressure of the cement slurry, the gases in the formation will migrate through the slurry from the formation. As a result, permanent channels in the cement can form. As a result of these channels, communication to the surface can occur and zonal isolation can be lost. The migration of gases from the formation through the cement can increase the pressure behind the casing. The migration of gases can reduce cement sheath integrity. A reduction of cement sheath integrity can lead to long term gas migration and sustained annular pressure. The pressure buildup between the casing string and the casing, called the casing-in-casing annulus (CCA) can lead to micro-annuli in the cement. As used here, "micro-annulus" refers to a small gap that can form between the casing or liner and the surrounding cement sheath. The buildup in annular pressures during the production life of the well can threaten the production of the well and the safety of the well. The buildup of pressure can lead to hazardous blowouts or to less severe controlled pressure release of a few pounds per square inch at the well head.

Early detection of CCA issues can reduce the risk of high severity blowouts and can avoid loss of production. Remedial solutions to CCA issues, such as operational changes and mechanical bleed-off units, can reduce CCA issues. Other approaches aim to make the cement sheath resistant to the influx of formation gases. One approach is to include the addition of a thin-film-forming latex additive to make the cement paste resistant to the influx of the formation gases. One problem with the use of latex additives is that latexes cannot prevent cement sheath failure at temperatures greater than 82 deg. C. or greater than 100 deg. C.

SUMMARY

Disclosed are compositions and methods for use in cement slurries. Specifically, disclosed are compositions and methods for controlling a downhole environment during cement operations.

In a first aspect, a method of using a gas control additive to provide gas migration control in a wellbore is provided. The method includes the step of mixing the gas control additive with a cement to form a cement slurry. The gas control additive includes a semi-permeable membrane and a scrubbing agent. The semi-permeable membrane forms a shell around a core such that the scrubbing agent is in the core. The method includes the step of introducing the cement slurry into the wellbore. The method includes the step of reacting the scrubbing agent with an antagonistic gas to produce a helper byproduct. The antagonistic gas migrates from a hydrocarbon-bearing formation into the wellbore and permeates through the semi-permeable membrane to the core of the gas control additive.

In certain aspects, the method further includes the step of setting the cement slurry to form a hardened cement. In certain aspects, the semi-permeable membrane includes a polymer that can include a polyamide, an aramide, a polyester, a polyurethane, and a polyurea. In certain aspects, the semi-permeable membrane attracts the antagonistic gas. In certain aspects, the scrubbing agent can include liquid scrubbers, solid scrubbers, and adsorbents. In certain aspects, the scrubbing agent is iron (III) oxide. In certain aspects, the scrubbing agent is calcium hydroxide. In certain aspects, the gas control additive is present in the cement slurry at a concentration of less than about 3% by weight of the cement slurry. In certain aspects, the antagonistic gas can include hydrogen sulfide, mercaptans, carbon dioxide, and natural gases. In certain aspects, the helper byproduct is water. In certain aspects, the helper byproduct is calcium carbonate. In certain aspects, the helper byproduct permeates through the semi-permeable membrane from the core. In certain aspects, in the reacting step, a solid product is produced. The semi-permeable membrane prevents the solid product from permeating through the semi-permeable membrane from the core of the gas control additive. In certain aspects, the solid product forms a physical barrier in a micro-annuli to prevent the antagonistic gas from migrating.

In a second aspect, a method of using a gas control additive to provide gas migration control in a wellbore is provided. The method includes the step of mixing the gas control additive with a cement to form a cement slurry. The gas control additive is formed by the step of mixing a first solvent, a first monomer, and a surfactant to produce a continuous phase. The gas control additive is formed by the step of mixing a second solvent, a second monomer, and a scrubbing agent to produce a dispersed phase. The gas control additive is formed by the step of mixing the continuous phase and the dispersed phase to form a mixture having an emulsion such that the dispersed phase is dispersed as droplets in the continuous phase. An interface defines the droplets of the dispersed phase dispersed in the continuous phase. The gas control additive is formed by the step of forming a polymer on the interface of the droplets, such that the polymer forms a semi-permeable membrane around a core. The core contains the dispersed phase, such that the semi-permeable membrane around the core forms the gas control additive. The gas control additive is formed by the step of settling the gas control additive from the mixture. The gas control additive is formed by the step of separating the gas control additive from the mixture using a separation method. The method includes the step of introducing the cement slurry into the wellbore. The method includes the step of reacting the scrubbing agent with an antagonistic gas to produce a helper byproduct. The antagonistic gas migrates from a hydrocarbon-bearing formation into the wellbore and permeates through the semi-permeable membrane to the core of the gas control additive.

In certain aspects, the method further includes the step of setting the cement slurry to form a hardened cement. In certain aspects, the dispersed phased includes a buffer. In certain aspects, the buffer includes phosphate. In certain aspects, the first solvent can include oil, mineral oil, cyclohexane, and chloroform. In certain aspects, the first monomer includes a tri-functional acid chloride. In certain aspects, the first monomer can include 1,3,5-benzenetricarbonyl trichloride and sebacoyl chloride. In certain aspects, the surfactant can include sorbitan esters and polysorbates. In certain aspects, the second solvent can include water, ethanol, and methanol. In certain aspects, the second monomer includes an amine group. In certain aspects, the second monomer can include ethylenediamine, meta-phenylenediamine, para-phenylenediamine, hexamethylenediamine, and 4,4'-methylenedianiline (MDA). In certain aspects, the scrubbing agent can include iron (III) oxide and calcium hydroxide. In certain aspects, the antagonistic gas can include hydrogen sulfide, mercaptans, carbon dioxide, and natural gases. In certain aspects, the helper byproduct can include water, calcium carbonate, and calcium bicarbonate. In certain aspects, the scrubbing agent is tethered in the core via site-isolation using a chelating agent including polyethylene glycols, polystyrenes, polyethylene imine, polyvinyl alcohols, ethylenediaminetetraacetic acid (EDTA), hydroxyethylethylenediaminetriacetic acid (HEDTA), nitrilotriacetic acid (NTA), and diethylenetriaminepentaacetic acid (DTPA).

In a third aspect, a gas control additive for providing gas migration control in a wellbore is provided. The gas control additive includes a semi-permeable membrane. The semi-permeable membrane includes a polymer. The semi-permeable membrane forms a shell with a core, such that the core contains a scrubbing agent. The semi-permeable membrane is operable to allow an antagonistic gas to permeate through the membrane into the core. The gas control additive includes the scrubbing agent. The scrubbing agent is operable to react with the antagonistic gas that permeates into the core to produce a helper byproduct. The polymer includes subunits derived from a first monomer including a di-functional amino group and subunits derived from a second monomer including a tri-functional acid chloride.

In certain aspects, the gas control additive further includes a chelating agent. The chelating agent is water-soluble and is operable to tether the scrubbing agent in the core via site-isolation and to increase the solubility of the scrubbing agent. In certain aspects, the chelating agent can include polyethylene glycols, polystyrenes, polyethylene imine, polyvinyl alcohols, EDTA, HEDTA, NTA, and DTPA. In certain aspects, the scrubbing agent can include iron (III) oxide and calcium hydroxide. In certain aspects, the first monomer can include ethylenediamine, meta-phenylenediamine, para-phenylenediamine, hexamethylenediamine, and MDA. In certain aspects, the second monomer can include 1,3,5-benzenetricarbonyl trichloride and sebacoyl chloride. In certain aspects, the antagonistic gas can include hydrogen sulfide, mercaptans, carbon dioxide, and natural gases. In certain aspects, the helper byproduct can include water, calcium carbonate, and calcium bicarbonate.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
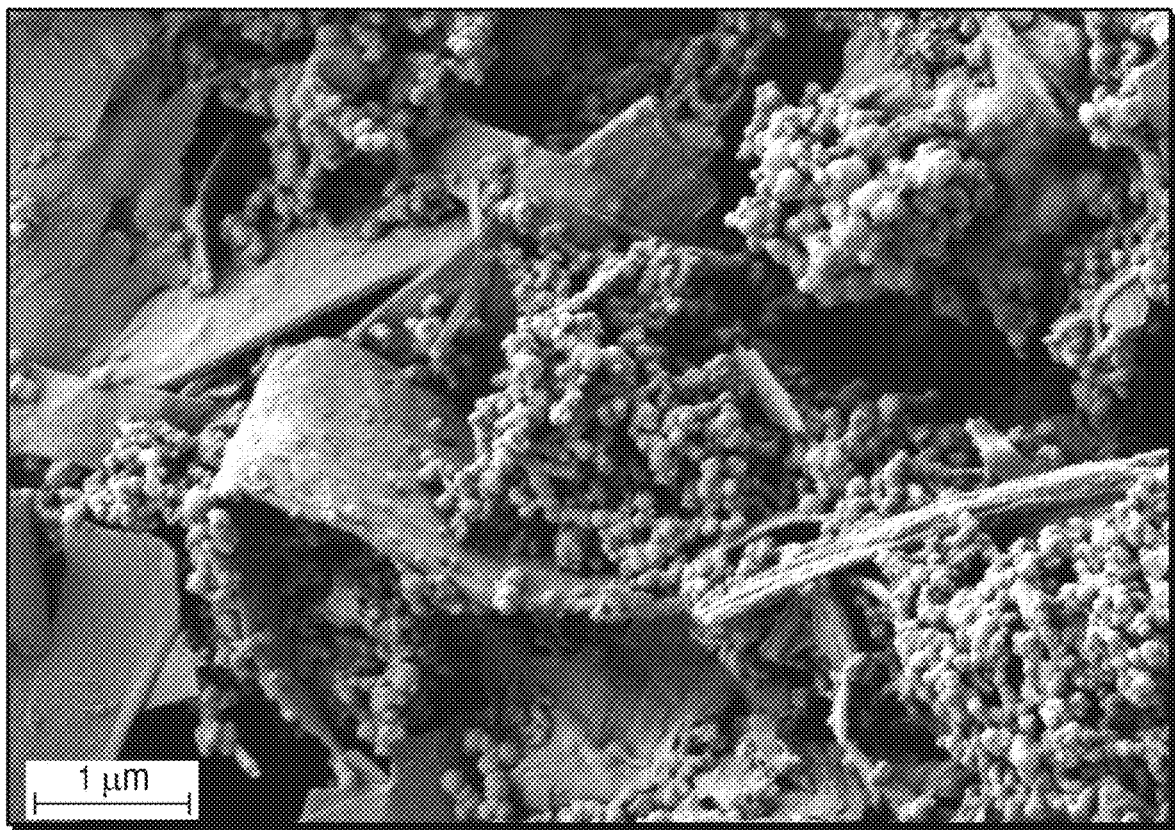
FIG. 1 provides a micrograph image of the gas control additive, developed by using scanning electron microscopy.

In the accompanying Figures, similar components or features, or both, may have a similar reference label.

DETAILED DESCRIPTION

While the scope of the composition and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The compositions and methods are directed to gas control additives that control the migration of gases through cement and buildup of pressure in the wellbore. The gas control additives include a scrubbing agent encapsulated by a semi-permeable membrane. The gas control additives can be mixed in with the cement slurry during cementing operations such that as the antagonistic gases migrate through the cement, the antagonistic gases encounter the gas control additive. The antagonistic gases permeate the semi-permeable membrane and react with the scrubbing agent. The reaction between the scrubbing agent and the antagonistic gas does not degrade the semi-permeable membrane. The reaction between the scrubbing agent and the antagonistic gas can produce a helper byproduct that can permeate the membrane and enter back into the cement. By-products from the reaction between the scrubbing agent and the antagonistic gas can remain in the semi-permeable membrane. Due to the semi-permeability of the semi-permeable membrane, passive permeation of antagonistic gases into the core of the gas control additive can occur which can then render the antagonistic gases inactive.

Advantageously, the compositions and methods described can remove the antagonistic gases or convert the antagonistic gases to helper byproducts, where the helper byproducts have decreased permeability and are less corrosive than the antagonistic gases. Advantageously, the semi-permeable membrane of the gas control additive compositions and methods can minimize leaching, chemical fouling, and can provide heat shielding of the scrubbing agents. The gas control additives can withstand the high temperatures of the downhole environment and protect the scrubbing agent from the high temperatures. Advantageously, the gas control additives can provide a just-in-time solution for gas migration control. Advantageously, the gas control additives can mitigate cement retrogression.

As used throughout, "gas control additive" refers to one or more particles of particular combination of semi-permeable membrane and scrubbing agent. A reference to the singular gas control additive includes multiple particles. A reference to the plural gas control additives is a reference to compositions of different semi-permeable membranes or scrubbing agents.

As used throughout, "antagonistic gas" refers to a gas or gases that can have a negative impact on the hardened cement, the casing, or other aspects of the wellbore. Antagonistic gases can include acid gases, such as hydrogen sulfide, mercaptans, carbon dioxide, natural gases, and combinations of the same.

As used throughout, "scavenger" or "gas scrubber" refer to a compound that can remove or de-activate gas.

As used throughout, "helper byproduct" refers to a byproduct from the reaction to neutralize the antagonistic gases which can positively impact the cement in the wellbore. The helper byproduct can be present as a solid, liquid or gas. As an example, the helper byproduct can be water present as water vapor or liquid water, where the water can positively impact the cement by providing hydration of the hardened cement. Other examples of the helper byproduct can include compounds having bicarbonates or carbonates (including cyclic carbonates), and solid sulfur. As an example, the helper byproduct can be calcium carbonate. Calcium carbonate is a cementitious material that is capable of physically forming a barrier against gases, which is advantageous in cases where the cement slurry is a self-healing type.

As used throughout, "shell" refers to an enclosure that completely surrounds a core.

As used throughout, "semi-permeable" means that certain components are able to pass through. The ability for a component to pass through a semi-permeable membrane depends on the size and charge of the component.

As used throughout, "shearing rate" refers to the mixing speed when forming the emulsion-based gas control additives.

As used throughout, "cement environment" refers collectively any stage of the cement process and includes both the cement slurry and the hardened cement.

As used throughout, "immiscible" means not forming a homogeneous mixture when two or more solvents are added together. Immiscible solvents may form an emulsion. Non-limiting examples of immiscible solvents include oil and water, and cyclohexane and water.

As used throughout, "wellbore" refers to a hole drilled into a subsurface formation of the earth, where the subsurface formation can contain hydrocarbons. The wellbore can have a depth from the surface and a diameter and can transverse the subsurface formation vertically, horizontally at a parallel to the surface, or at any angle between vertically and parallel.

As used throughout, "aramide" refers to an aromatic polyamide. Terms such as "aramids," "aramides," "polyaramids," "polyaramides," "aramid polymers," "aramide polymers," and "aromatic polyamides" are used interchangeably. Commercial examples of aramides include para-aramides such as Kevlar® (available from Dupont®, Wilmington, Del.), Technora® (available from Teijin Aramid USA, Inc, Conyers, Ga.), Twaron® (available from Teijin Aramid USA, Inc, Conyers, Ga.), and Heracron® (available from Kolon Industries, Inc., Gwachon, Korea), and meta-aramides such as Nomex® (available from Dupont®, Wilmington, Del.) and Teijinconex® (available from Teijin Aramid USA, Inc, Conyers, Ga.). A para-aramide is an aramide where the polymer chain is connected via the para positions of an acyl group subunit or functional group. A meta-aramide is an aramide where the polymer chain is connected via the meta positions of an acyl group subunit or functional group.

The gas control additives are composed of a scrubbing agent encapsulated by a semi-permeable membrane. The gas control additive can have a specific gravity of between 1.0 and 1.5, alternately of between 1.2 and 1.4. The gas control additives are capsule-based.

The scrubbing agent can be any scavenger capable of reacting with an antagonistic gas to neutralize the antagonistic gas. Scrubbing agents can include liquid scrubbers, solid scrubbers, and adsorbents. Scrubbing agents can include commercially-available gas scrubbers. Liquid scrubbers can include sodium hydroxide (NaOH), sodium carbonate ($Na_2CO_3$), magnesium hydroxide ($Mg(OH)_2$), calcium hydroxide ($Ca(OH)_2$), and combinations of the same. Sodium hydroxide is also known as caustic soda. Sodium carbonate is also known as soda ash. Aqueous calcium hydroxide is also known as lime water. Solid scrubbers can include activated alumina, metals, metal oxides, alkali metal bases, dry sorbents, titania, and combinations of the same. Metals can include iron (Fe(II) or Fe(III)), lead (Pb(II)), copper (Cu(II)), mercury (Hg(II)), and arsenic (As(III)). Metal oxides can include zinc oxide (ZnO), iron oxides, and combinations of the same. Iron oxides can include iron (II) oxide (FeO), iron (III) oxide ($Fe_2O_3$), iron (II, III) oxide ($Fe_3O_4$ or $FeO.Fe_2O_3$), and combinations of the same. Iron (II, III) oxide is also known as magnetite. Other metal compounds include lead acetates such as $Pb(CH_3COO)_2$, $Pb(CH_3COO)_4$, and $Pb_3(OH)_4(CH_3COO)_2$, zinc carbonates such as $ZnCO_3$ and $Zn_5(OH)_6(CO_3)_2$, copper carbonate ($CuCO_3$), and combinations of the same. Alkali metal bases can include sodium hydroxide and calcium hydroxide. Adsorbents can include any compound with a reaction mechanism by which the antagonistic gases adsorbs to the surface of the compound.

In at least one embodiment, iron (III) can react with hydrogen sulfide to produce a solid iron (III) sulfide ($Fe_2S_3$). Iron (II) can react with hydrogen sulfide to produce a solid iron (II) sulfide (FeS). Magnetite can react with hydrogen sulfide to produce iron (III) sulfide, iron (II) sulfide, or iron (II) disulfide ($FeS_2$). Zinc carbonates can react with hydrogen sulfide to produce a solid zinc sulfide (ZnS). Copper carbonate can react with hydrogen sulfide to produce a solid copper (II) sulfide (CuS). Calcium hydroxide can react with carbon dioxide to produce a solid calcium carbonate ($CaCO_3$).

The semi-permeable membrane can be a polymer that is semi-permeable. The polymer can be formed through a polycondensation reaction. The polymer can be a cross-linked polymer. Examples of the polymer that can form the semi-permeable membrane include polyamides and aramides. The polycondensation reaction can form other polymers suitable for the semi-permeable membrane, such as polyesters, polyurethanes, and polyureas. Without being bound by any theory, it is believed that polyamides and aramides can attract antagonistic gases such as hydrogen sulfide due to the amine groups. Advantageously, aramides have high-temperature resistance and ballistic-rated strength. The semi-permeable membrane forms a shell. The semi-permeable membrane can be heat resistant up to temperatures of 400 deg. C. The semi-permeable membrane can be designed such that the scrubbing agent cannot permeate out of the semi-permeable membrane. The semi-permeable membrane can act as a barrier such that the scrubbing agent cannot interact with other reagents in the cement slurry. The semi-permeable membrane can maintain the integrity of the scrubbing agent and keep the scrubbing agent from degrading in the presence of the cement slurry until desired. The semi-permeable membrane does not degrade. The semi-permeable membrane can prevent the scrubbing agent from reacting with cement hydrates. The semi-permeable membrane provides for a controlled release rate of the helper byproduct. The extent of crosslinking of the aramide polymer can determine the permeability of the semi-permeable membrane. The release rate can be controlled by adjusting the permeability of the semi-permeable membrane.

The gas control additive can be formed through the method of interfacial polymerization. In the process of interfacial polymerization two immiscible fluids, such as a continuous phase and a dispersed phase, are blended together until the dispersed phase is dispersed as droplets in the continuous phase forming an emulsion. Each phase contains a monomer and the polymer can form on the interface between the dispersed droplet and the continuous phase forming a shell around the droplet of the dispersed phase, such that the dispersed phase is captured within the shell. The shell formed through interfacial polymerization is the semi-permeable membrane. Each phase can include a crosslinker as a monomer.

The continuous phase can include a solvent, a monomer, and a surfactant. The solvent for the continuous phase can be any solvent immiscible with water. Non-polar solvents suitable for use as the continuous solvent include oil, mineral oil, cyclohexane, chloroform, and combinations of the same. The monomer for the continuous phase can be any acyl chloride monomer. The monomer for the continuous phase can be any monomer containing a tri-functional acid chloride or a di-functional chloride. Examples of monomers for the continuous phase include 1,3,5-benzenetricarbonyl trichloride and sebacoyl chloride. The monomer for the continuous phase may serve as a crosslinker. The surfactant can include sobitan esters, polyethoxylated sorbitan esters, and combinations of the same. More than one monomers for the continuous phase can be used to control the permeability of the semi-permeable membrane.

The dispersed phase can include a solvent, a monomer, and the scrubbing agent. Solvents for the dispersed phase can include water, ethanol, methanol, and combinations of the same. The monomer for the dispersed phase can be any water-soluble diamine. The monomer for the dispersed phase can be any monomer including a di-functional amino group. Examples of monomers for the dispersed phase include ethylenediamine, meta-phenylenediamine, para-phenylenediamine, hexamethylenediamine, polyethyleneimine, MDA, and combinations of the same. More than one monomers for the dispersed phase can be used to control the permeability of the semi-permeable membrane. The scrubbing agents can be heterogeneous or solubilized. The scrubbing agents can be blended into the dispersed phase. In at least one embodiment, the scrubbing agents can be blended into the dispersed phase to form an emulsion. In at least one embodiment, a chelating agent can be added to the dispersed phase to improve the water solubility of the scrubbing agent. Examples of a chelating agent include EDTA, HEDTA, NTA, DTPA, and combinations of the same. Examples of a chelating agent also include polyethylene glycol, polyvinyl alcohol, and combinations of the same. Salt forms of the chelating agent can be added to the dispersed phase, such as ethylenediaminetetraacetic acid iron (III) monosodium salt (Na[Fe(III)EDTA]). In at least one embodiment, a buffer can be added to the dispersed phase. The buffer can increase the scrubbing capacity of the gas control additive. Examples of the buffer include a phosphate buffer such as trisodium phosphate ($Na_3PO_4$). One skilled in the art may appreciate that phosphoric acid is a polyprotic acid having multiple acid dissociation constants ($K_a$). $pK_a$ values of phosphoric acid are 2.15, 6.86, and 12.32. The phosphate buffer can be prepared near a pH of any of the three $pK_a$ values. When using trisodium phosphate as the buffer, the pH of the dispersed phase can be set to about 12.3.

The continuous phase solvent and the dispersed phase solvent can be selected such that the two fluids are immiscible with each other.

The monomer for the continuous phase and the monomer for the dispersed phase can be selected together in consideration of the properties of the polymer that forms the semi-permeable membrane. The monomer for the continuous phase and the monomer for the dispersed phase can be selected to produce polyamides, aramides, polyesters, polyurethanes, polyureas, and combinations of the same. The amount of monomer added to the continuous phase can control permeability of the semi-permeable membrane.

The continuous phase and the dispersed phase are blended together until the dispersed phase is dispersed as droplets in the continuous phase forming an emulsion. Depending on the volume of each phase a water-in-oil (w/o) emulsion or an oil-in-water (o/w) can be formed. Accordingly, depending on the volume of each phase the continuous phase can be the dispersed phase and in turn, the dispersed phase can be the continuous phase. The droplets can have different shapes including spheres, rods, and fibers. The size of the droplets of the dispersed phase can be between 100 nanometers (nm) and 50 microns (µm), alternately between 100 nm and 1 µm, alternately between 1 µm and 10 µm, and alternately between 10 µm and 50 µm.

Referring to FIG. 1, the micrograph images shows the polydispersity of the capsules of the gas control additives. Some evidence of the film-forming behavior is shown that can also be used to mitigate gas migration. FIG. 1 includes capsules of the gas control additives having an average diameter at about 142 nm. The micrograph images were developed using scanning electron microscopy (SEM) consisting of sputter coating the sample with palladium and gold and imaging with a Zeiss Crossbeam 540 SEM (Carl Zeiss AG, Oberkochen, Germany). The size and shape of the droplets of the dispersed phase in the continuous phase can be controlled by the shearing rate, the use of laminar flow, the solvent in the dispersed phase, the density of the solvent in the dispersed phase, the rate of blending of the solvents in the continuous phase and the solvent in the dispersed phase, and viscosity of the dispersed phase. In at least one embodiment, laminar flow can be used form fibers. The size of the droplets can be optimized to impart a low rheological property to the cement slurry.

The polymer forms on the interface of the dispersed droplet and the continuous phase creating the capsules of the gas control additives. The polymerization reaction occurs at room temperature. The mixture is stirred to enhance homogeneity of the polymer. In at least one embodiment, the mixture can be stirred for a period from about 24 hours to about 72 hours. In at least one embodiment, the gas control additives can settle to the bottom of the reactor. In a next step, the gas control additives are separated from the liquids remaining. The separation method used to separate the gas control additives can be any process capable of separating a liquid and leaving behind dry capsules as a free-flowing powder. Separation methods can include decantation, filtration, centrifuging, rotary evaporation, vacuum drying, oven drying, and combinations of the same. In at least one embodiment, the separation method leaves a liquid at the core, creating a liquid-redox scrubber gas control additive. In at least one embodiment, the separation method results in desiccation of the gas control additive removing the liquid in the core. In at least one embodiment, the dry capsules can be washed to remove any residue of the continuous phase and then dried.

In at least one embodiment, the continuous phase, containing a solvent and a surfactant, can be mixed with the dispersed phase, containing a solvent and monomer, such that the dispersed phase is dispersed as droplets in the continuous phase forming an emulsion. The monomer for the continuous phase can then be added to the emulsion causing the polymer to form at the interface of the droplets due to the reaction of the monomer in the dispersed phase and the monomer in the continuous phase.

Additional reagents that can be added to the continuous phase and the dispersed phase include emulsifiers. In at least one embodiment, the emulsifier added to the continuous phase is sorbitan trioleate. In at least one embodiment, the emulsifier added to the dispersed phase is polyethoxylated sorbitan ester.

The gas control additives can be used to provide gas migration control. The gas control additive is mixed with a cement slurry at any time prior to the cement slurry being introduced to a formation. In at least one embodiment, the gas control additive can be mixed with a cement slurry according to the API RP 10-B standard. The gas control additives can be mixed with the cement slurry as a free-flowing dry powder, as liquid-filled capsules, or as part of a liquid emulsion. The gas control additive can be used with any type of cement slurry. In at least one embodiment, the cement in the cement slurry is hydrophilic. In at least one embodiment, the cement slurry includes a class G Portland cement. In at least one embodiment, the scrubbing agent is present in the cement slurry at a concentration of between about 0.05% by weight of cement and about 0.5% by weight of cement. In at least one embodiment, the polymer of the semi-permeable membrane is present in the cement slurry at a concentration of up to about 3% by weight of cement. In at least one embodiment, two or more gas control additives can be added to the cement slurry, such that two or more different scrubbing agents are carried into the cement slurry. The gas control additive can be mixed within the cement slurry to distribute the gas control additive through the cement slurry. The cement slurry can be introduced to the formation according to any process for placing cementing in a wellbore or formation.

The cement slurry sets into a hardened cement such that the gas control additives are embedded in the hardened cement. In some embodiments, the hardened cement including the gas control additives exhibits an unconfined compression strength ranging from about 2,500 psi to about 3,500 psi at about 350 deg. F. for about 120 hours. In other embodiments, the hardened cement including the gas control additives exhibits an unconfined compression strength ranging from about 2,800 psi to about 3,500 psi at about 350 deg. F. for about 120 hours. Still in other embodiments, the hardened cement including the gas control additives exhibits an unconfined compression strength ranging from about 3,000 psi to about 3,400 psi at about 350 deg. F. for about 120 hours. For comparison, neat cement exhibits an unconfined compression strength in similar conditions ranging from about 3,000 psi to about 4,000 psi, alternately from about 3,400 psi to about 3,700 psi, or alternately from about 3,500 psi to about 3,600 psi. Also for comparison, latex-containing hardened cement exhibits an unconfined compression strength in similar conditions ranging from about 1,500 psi to about 2,500 psi, alternately from about 1,800 psi to about 2,300 psi, or alternately from about 1,900 psi to about 2,200 psi. In some embodiments, the hardened cement including the aramide capsules exhibits a confined compression strength ranging from about 5,000 psi to about 14,000 psi at room temperature. In other embodiments, the hardened cement including the aramide capsules exhibits a confined compression strength ranging from about 9,000 psi to about 12,000 psi at room temperature.

Antagonistic gases can migrate from the formation through the cement slurry and the hardened cement. As the antagonistic gases migrate through the cement slurry or the hardened cement the gases can encounter the gas control additives. Antagonistic gases can be attracted by the polyamide or aramide-based semi-permeable membrane due to the amine groups. In some embodiments, the antagonistic gases do not react with the semi-permeable membrane. The antagonistic gases can permeate through the semi-permeable membrane.

In the semi-permeable membrane, the antagonistic gases react with the scrubbing agent. In at least one embodiment, the antagonistic gas and the scrubbing agent react to produce a helper byproduct and a secondary byproduct. The helper byproduct can permeate through the semi-permeable membrane to the cement slurry or the hardened cement. In at least one embodiment, the helper byproduct is less corrosive than the antagonistic gas. In at least one embodiment, the helper byproduct can be water and the water can permeate through the semi-permeable membrane to the cement slurry or the hardened cement and can hydrate the cement. The volume of the gas control additive can change by less than 1% by volume over the life of the gas control additive.

In other embodiments, the helper byproduct can include compounds having bicarbonates or carbonates (including cyclic carbonates), and solid sulfur. In at least one embodiment, the helper byproduct can be a solid product including calcium bicarbonate or calcium carbonate. Calcium bicarbonate and calcium carbonate can exist in solid form such that the semi-permeable membrane prevents the solid product from permeating through the semi-permeable membrane from the core of the gas control additive. In addition, due to bicarbonate and carbonate-based compounds having cementitious properties, the solid product can form a self-sealing physical barrier in a micro-annuli, if any, to prevent gases from migrating.

The gas control additives can continue to provide gas migration control until the scrubbing agent is depleted or becomes non-reactive. When the scrubbing agent becomes non-reactive, the semi-permeable membrane of the inactive gas control additive can provide strengthening properties to the hardened cement. That is, the polymer shell integrity is maintained regardless of the status of the scrubbing agent located within the shell.

The gas migration control method and composition is in the absence of the scrubbing agent permeating through the semi-permeable membrane from the core to the hardened cement. In at least one embodiment, the scrubbing agent is tethered in the core of the gas control additive via site-isolation using a linear polymer. The scrubbing agent can be tethered to the semi-permeable membrane, tethered within the semi-permeable membrane, or tethered onto the semi-permeable membrane. In at least one embodiment, the scrubbing agent can be site-isolated using linear polymers, such as polyethylene glycols (PEGs), polystyrenes, polyethylene imine, polyvinyl alcohols, and combinations of the same. These linear polymers are typically water-soluble. The side chains of these linear polymers can be designed to contain the scrubbing agent via chelation. Non-limiting examples of tethered scrubbing agents include salts, accelerators, and metal catalysts. Examples of a chelating agent include EDTA, HEDTA, NTA, DTPA, and combinations of the same. Examples of a chelating agent also include polyethylene glycol, polyvinyl alcohol, and combinations of the same. Salt forms of the chelating agent can be added to the dispersed phase, such as ethylenediaminetetraacetic acid iron (III) monosodium salt (Na[Fe(III)EDTA]). In other embodiments, these linear polymers can be cleaved such that the cleaved molecules can travel through the semi-permeable membrane. For example, linear polymers having carboxylic acid groups can be cleaved such that the cleaved molecule having the carboxylic acid group may serve as a cement retarder. In some embodiments, a viscosifier can be used to site-isolate the scrubbing agent.

Figure 2:
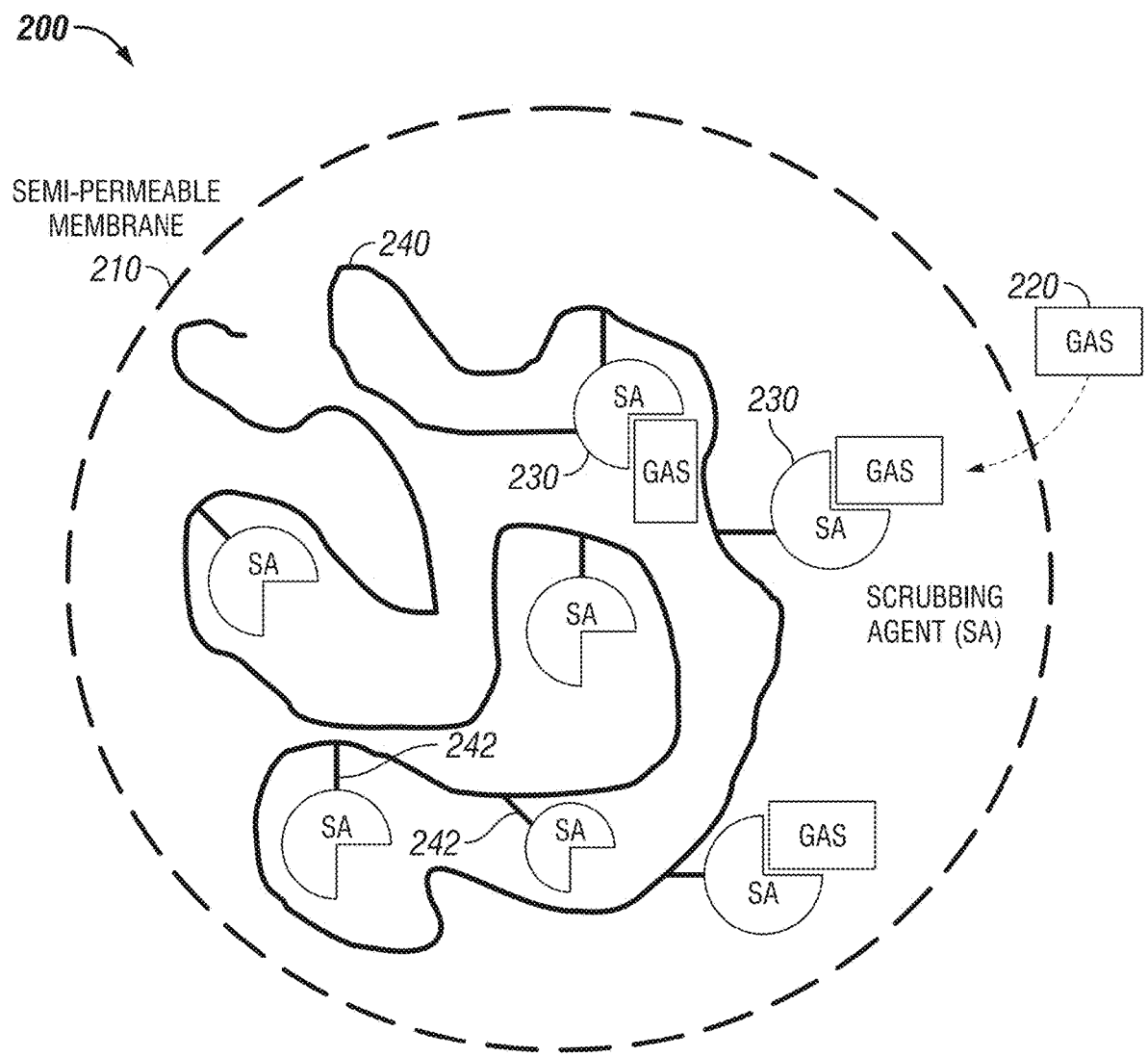
FIG. 2 provides a pictorial representation of the gas migration control method with a scrubbing agent.

FIG. 2 shows a pictorial representation of the gas migration control method and the gas control additive 200. As shown in FIG. 1, the gas control additive 200 has a spherical shape where the shell includes a semi-permeable membrane 210. The gas in the box represents the antagonistic gas 220. The polyamide or aramide-based material of the semi-permeable membrane 210 attracts the antagonistic gas 220. The antagonistic gas 220 permeates into the semi-permeable membrane 210. The antagonistic gas 220 reacts with the scrubbing agent 230 marked as SA. The solid line represents the linear polymer 240, where the linear polymer enables the scrubbing agent 230 to be site-isolated via the side chains 242.

In at least one embodiment, the scrubbing agent is an activated alumina, the semi-permeable membrane is composed of a polyamide polymer and hydrogen sulfide permeates the semi-permeable membrane to react with the activated alumina.

Figure 3:
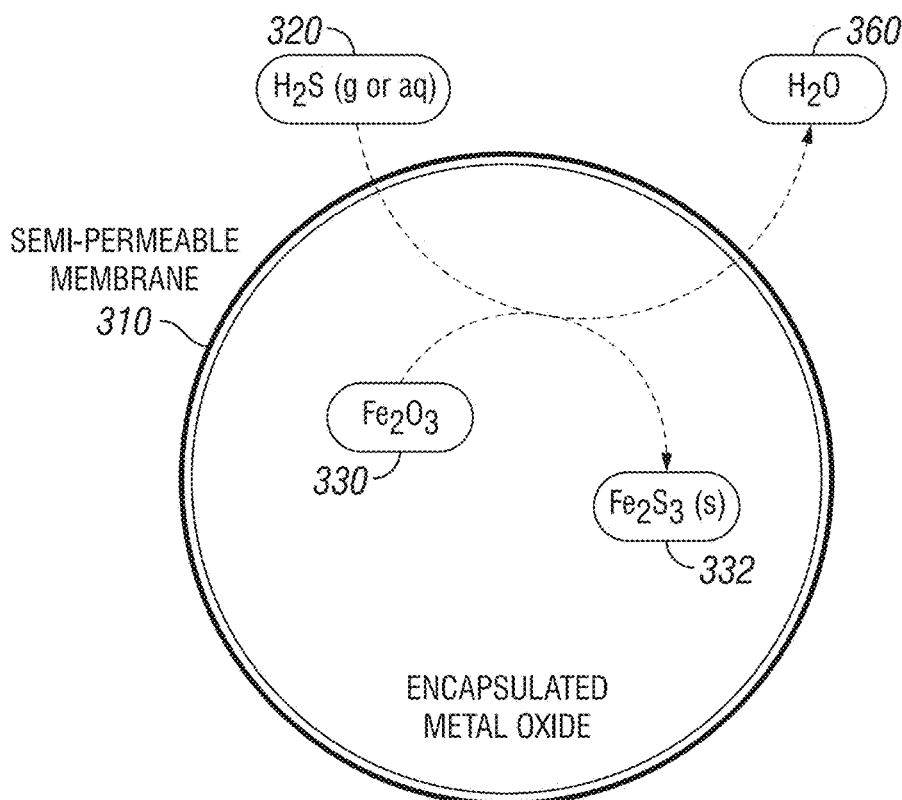
FIG. 3 provides a pictorial representation of the gas migration control method with a gas scrubbing additive where the scrubbing agent is iron (III) oxide.

In at least one embodiment, the method of gas migration control with a gas scrubbing additive is shown in FIG. 3. A metal oxide-based scrubbing agent 330 is encapsulated by the semi-permeable membrane 310. The semi-permeable membrane 310 is polyamide or aramide-based. As shown in FIG. 3, the scrubbing agent 330 is iron (III) oxide ($Fe_2O_3$). The iron (III) oxide may exist in a solid form or a hydrated form ($Fe_2O_3.nH_2O$). The scrubbing agent 330 can be iron (II, III) oxide ($Fe_3O_4$ or $FeO.Fe_2O_3$) known as magnetite, which is a combination of iron (II) oxide and iron (III) oxide. The semi-permeable membrane 310 is designed such that the solid or hydrated iron (III) oxide cannot permeate out of the semi-permeable membrane 310. The antagonistic gas 320 is hydrogen sulfide ($H_2S$). The semi-permeable membrane 310 may attract the hydrogen sulfide. As the hydrogen sulfide permeates through the semi-permeable membrane 310, the hydrogen sulfide reacts with the iron (III) oxide to produce water and iron (III) sulfide ($Fe_2S_3$). The hydrogen sulfide can react with the iron (II) oxide to produce water and iron (II) sulfide (FeS). The hydrogen sulfide can react with magnetite to produce iron (III) sulfide, iron (II) sulfide, or iron (II) disulfide ($FeS_2$). The helper byproduct 360 is the produced water. The produced water can exist in a gas or a liquid form. The secondary byproduct 332 is iron (III) sulfide. The secondary byproduct 332 can also be iron (II) sulfide, iron (II) disulfide, or solid sulfur. The iron (III) sulfide may exist in a solid form. The iron (III) sulfide remains in the semi-permeable membrane 310 while the produced water permeates out of the semi-permeable membrane 310.

Figure 4:
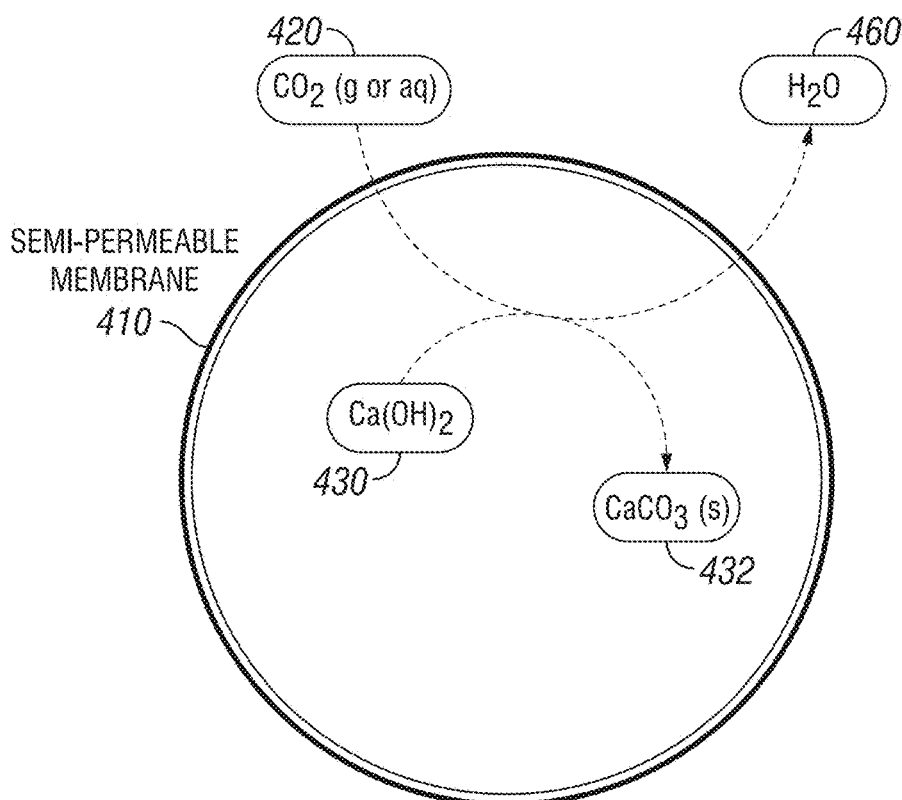
FIG. 4 provides a pictorial representation of the gas migration control method with a gas scrubbing additive where the scrubbing agent is calcium hydroxide.

In at least one embodiment, the method of gas migration control with a gas scrubbing additive is shown in FIG. 4. A metal hydroxide-based scrubbing agent 430 can be encapsulated by the semi-permeable membrane 410. The semi-permeable membrane 410 is polyamide or aramide-based. As shown in FIG. 4, the scrubbing agent 430 is calcium hydroxide ($Ca(OH)_2$). The calcium hydroxide may exist in a solid form or a hydrated form ($Ca(OH)_2.nH_2O$). The semi-permeable membrane 410 is designed such that the solid or hydrated calcium hydroxide cannot permeate out of the semi-permeable membrane 410. In other embodiments, the metal hydroxide-based scrubbing agent 430 can exist in an aqueous form, such as lime water where the scrubbing agent 430 is also calcium hydroxide. The semi-permeable membrane 410 can be designed such that the aqueous calcium hydroxide permeates into the semi-permeable membrane 410. The antagonistic gas 420 is carbon dioxide ($CO_2$). The semi-permeable membrane 410 may attract the carbon dioxide. As the carbon dioxide permeates through the semi-permeable membrane 410, the carbon dioxide reacts with the calcium hydroxide to produce water and calcium carbonate ($CaCO_3$). The carbon dioxide may react with the calcium hydroxide to produce bicarbonates such as calcium bicarbonate ($Ca(HCO_3)_2$). One helper byproduct 460 is the produced water. The produced water can exist in a gas or a liquid form. The other helper byproduct 432 of the reaction is calcium carbonate or calcium bicarbonate. The calcium carbonate exists in a solid form. The calcium carbonate remains in the semi-permeable membrane 410 while the produced water permeates out of the semi-permeable membrane 410. In addition, the calcium carbonate is a cementitious material that is capable of physically forming a barrier against gases, which is advantageous in cases where the cement slurry is a self-healing type.

The method of interfacial polymerization described here provides capsules that allow for reaction between the scrubbing agent and the antagonistic gases without resulting in the dissolution of the semi-permeable membrane. This is an advantage over methods that encapsulate solids by spray drying and pan coating, which deposit a chemical coating on the surface of the encapsulant, where the chemical coating dissolves or disintegrates to release encapsulant.

Cement ductility refers to a measure of cement reliability where cement integrity is enhanced by making cement more elastic and ductile. Advantageously, the semi-permeable membrane of the gas control additive improves cement ductility.

In at least one embodiment, the gas control additive is in the absence of a molecular sieve. In at least one embodiment, the cement slurry with the gas control additive is in the absence of a latex.

In at least one embodiment, the gas control additive can be included in certain drilling fluids and other completion fluids that may be in contact with the antagonistic gases during drilling.

Example 1

A gas control additive sample was formed according to the method described. The solvent for the continuous phase was a 4:1 cyclohexane-chloroform blend. The surfactant was sorbitan trioleate (Span-85®, Sigma-Aldrich®, St. Louis, Mo.). The monomer for the continuous phase was 1,3,5-benzenetricarbonyl trichloride. The solvent for the dispersed phase was water. The monomer for the dispersed phase included a diamine, such as 1,3-phenylenediamine, 1,4-phenylenediamine, 1,6-diaminohexane, and polyethyleneimine. The scrubbing agent was $Fe_3O_4$, which can be expressed as $FeO.Fe_2O_3$ having both iron (II) and iron (III)

cationic moieties. The dispersed phase also included a site-isolating chelating agent EDTA.

The gas control additive sample was prepared at room temperature. The continuous phase was prepared in a 2 liter (L) two-neck round bottom flask by adding 750 milliliters (mL) of the solvent and a 2.0% by volume of the surfactant. 200 mL of the dispersed phase was prepared by adding the monomer and 30 grams (g) of the chelated scrubbing agent in the form of ethylenediaminetetraacetic acid iron (III) monosodium salt (Na[Fe(III)EDTA]). The iron (III) moiety operated as the scrubbing agent. Optionally, a trisodium phosphate buffer solution was added to the dispersed phase while maintaining the pH at about 12.3. The dispersed phase was added to the continuous phase and was stirred at 600 revolutions per minute (rpm) with a Caframo BDC2002 overhead stirrer (Georgian Bluffs, Canada) for 15 minutes forming a w/o emulsion. After stirring, 26.5 g of the monomer for the continuous phase dissolved in 200 mL of 4:1 cyclohexane-chloroform blend was added to the emulsion at a rate of about 1 mL per minute. Stirring continued while the monomer for the continuous phase was being added maintaining the w/o emulsion. The polymer solution was then stirred for about 24 hours. The resulting polymer-based gas control additive sample was left to settle and was decanted. The gas control additive sample was washed with a 1% bicarbonate solution for 5 minutes. The washed gas control additive sample was dried at 180 deg. F. overnight or until a constant weight of free-flowing powder was obtained.

Example 2

A gas control additive sample was formed according to the method described. The solvent for the continuous phase was a 4:1 cyclohexane-chloroform blend. The monomer for the continuous phase was 1,3,5-benzenetricarbonyl trichloride. The surfactant was sorbitan trioleate (Span-85®, Sigma-Aldrich®, St. Louis, Mo.). The solvent for the dispersed phase was water. The monomer for the dispersed phase was MDA. The scrubbing agent was calcium hydroxide.

The gas control additive sample was prepared at room temperature. The continuous phase was prepared in a 2 L two-neck round bottom flask by adding 750 mL of the solvent and a 2.0% by volume of the surfactant. The dispersed phase was prepared by adding 200 mL of lime water and 16.2 g MDA. The calcium hydroxide present in lime water operated as the scrubbing agent. 10 to 12 drops of a phenolphthalein colorimetric pH indicator was added to the dispersed phase to monitor the change in pH. Optionally, a trisodium phosphate buffer solution was added to the dispersed phase while maintaining the pH at about 12.3. The dispersed phase was added to the continuous phase and was stirred at 600 rpm with a Caframo BDC2002 overhead stirrer (Georgian Bluffs, Canada) for 15 minutes forming a w/o emulsion. After stirring, 26.5 g of the monomer for the continuous phase dissolved in 200 mL of 4:1 cyclohexane-chloroform blend was added to the emulsion at a rate of about 1 mL per minute. Stirring continued while the monomer for the continuous phase was being added maintaining the w/o emulsion. The polymer solution was then stirred for about 24 hours. The resulting polymer-based gas control additive sample was left to settle and was decanted. The gas control additive sample was washed with a 1% bicarbonate solution for 5 minutes. The washed gas control additive sample was dried at 180 deg. F. overnight or until a constant weight of free-flowing powder was obtained.

The gas control additive was placed in a carbon dioxide environment, where the carbon dioxide was present either as a sweet gas solubilized in water or as a free gas. The carbon dioxide operated as the antagonistic gas, where the carbon dioxide permeated into the semi-permeable membrane of the gas control additive and reacted with the scrubbing agent. The reaction produced water and solid calcium carbonate (or calcium bicarbonate) as helper byproducts. Due to the presence of the colorimetric pH indicator, as the reaction took place in the gas control additive, the color of the pH indicator gradually changed from red to transparent, indicating that hydroxide anions originating from the scrubbing agent were consumed by the reaction. The produced calcium carbonate (or calcium bicarbonate) may serve as a cementitious material to the cement sheath, a self-sealing product, and a physical barrier to communicating micro-annuli cracks that may be present in the cement. The produced water may serve as a supplemental hydration source during the cement hardening process.

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

What is claimed is:

1. A method of using a gas control additive to provide gas migration control in a wellbore, the method comprising the steps of:
   mixing the gas control additive with a cement to form a cement slurry, where the gas control additive is formed by the steps of:
      mixing a first solvent, a first monomer, and a surfactant to produce a continuous phase;
      mixing a second solvent, a second monomer, and a scrubbing agent to produce a dispersed phase;
      mixing the continuous phase and the dispersed phase to form a mixture having an emulsion such that the dispersed phase is dispersed as droplets in the continuous phase, where an interface defines the droplets of the dispersed phase dispersed in the continuous phase;
      forming a polymer on the interface of the droplets, such that the polymer forms a semi-permeable membrane around a core, where the core contains the dispersed phase, such that the semi-permeable membrane around the core forms the gas control additive; and
      settling the gas control additive from the mixture; and separating the gas control additive from the mixture using a separation method;

introducing the cement slurry into the wellbore; and reacting the scrubbing agent with an antagonistic gas to produce a helper byproduct, where the antagonistic gas migrates from a hydrocarbon-bearing formation into the wellbore and permeates through the semi-permeable membrane to the core of the gas control additive, where the scrubbing agent is selected from the group consisting of: iron (III) oxide, calcium hydroxide, and combinations of the same.

2. A method of using a gas control additive to provide gas migration control in a wellbore, the method comprising the steps of:

mixing the gas control additive with a cement to form a cement slurry, where the gas control additive is formed by the steps of:

mixing a first solvent, a first monomer, and a surfactant to produce a continuous phase;

mixing a second solvent, a second monomer, and a scrubbing agent to produce a dispersed phase;

mixing the continuous phase and the dispersed phase to form a mixture having an emulsion such that the dispersed phase is dispersed as droplets in the continuous phase, where an interface defines the droplets of the dispersed phase dispersed in the continuous phase;

forming a polymer on the interface of the droplets, such that the polymer forms a semi-permeable membrane around a core, where the core contains the dispersed phase, such that the semi-permeable membrane around the core forms the gas control additive; and settling the gas control additive from the mixture; and separating the gas control additive from the mixture using a separation method;

introducing the cement slurry into the wellbore; and reacting the scrubbing agent with an antagonistic gas to produce a helper byproduct, where the antagonistic gas migrates from a hydrocarbon-bearing formation into the wellbore and permeates through the semi-permeable membrane to the core of the gas control additive, where the helper byproduct is selected from the group consisting of: water, calcium carbonate, calcium bicarbonate, and combinations of the same.

3. A method of using a gas control additive to provide gas migration control in a wellbore, the method comprising the steps of:

mixing the gas control additive with a cement to form a cement slurry, where the gas control additive is formed by the steps of:

mixing a first solvent, a first monomer, and a surfactant to produce a continuous phase;

mixing a second solvent, a second monomer, and a scrubbing agent to produce a dispersed phase;

mixing the continuous phase and the dispersed phase to form a mixture having an emulsion such that the dispersed phase is dispersed as droplets in the continuous phase, where an interface defines the droplets of the dispersed phase dispersed in the continuous phase;

forming a polymer on the interface of the droplets, such that the polymer forms a semi-permeable membrane around a core, where the core contains the dispersed phase, such that the semi-permeable membrane around the core forms the gas control additive; and settling the gas control additive from the mixture; and separating the gas control additive from the mixture using a separation method;

introducing the cement slurry into the wellbore; and reacting the scrubbing agent with an antagonistic gas to produce a helper byproduct, where the antagonistic gas migrates from a hydrocarbon-bearing formation into the wellbore and permeates through the semi-permeable membrane to the core of the gas control additive, where the scrubbing agent is tethered in the core via site-isolation using a chelating agent selected from the group consisting of: polyethylene glycols, polystyrenes, polyethylene imine, polyvinyl alcohols, ethylenediaminetetraacetic acid, hydroxyethylethylenediaminetriacetic acid, nitrilotriacetic acid, diethylenetriaminepentaacetic acid, and combinations of the same.

* * * * *